(12) United States Patent
Powell et al.

(10) Patent No.: US 8,000,891 B2
(45) Date of Patent: *Aug. 16, 2011

(54) DATA FORMATS AND USAGE FOR MASSIVE POINT TO POINT ROUTE CALCULATION

(75) Inventors: G. Edward Powell, Austin, TX (US); Sheng Chen, Austin, TX (US); Runar Indseth, Austin, TX (US)

(73) Assignee: Pointserve, Inc., Austin, TX (US)

( * ) Notice: Subject to any disclaimer, the term of this patent is extended or adjusted under 35 U.S.C. 154(b) by 1454 days.

This patent is subject to a terminal disclaimer.

(21) Appl. No.: 11/437,815

(22) Filed: May 22, 2006

(65) Prior Publication Data

US 2009/0326793 A1 Dec. 31, 2009

Related U.S. Application Data

(63) Continuation of application No. 09/790,333, filed on Feb. 22, 2001, now Pat. No. 7,050,904.

(60) Provisional application No. 60/184,186, filed on Feb. 22, 2000.

(51) Int. Cl.
*G06F 17/00* (2006.01)

(52) U.S. Cl. ......................................... 701/201; 701/209

(58) Field of Classification Search ........................ None
See application file for complete search history.

(56) References Cited

U.S. PATENT DOCUMENTS

| | | | |
|---|---|---|---|
| 4,984,168 A | 1/1991 | Neukrichner et al. |
| 5,031,093 A | 7/1991 | Hasegawa |
| 5,197,009 A | 3/1993 | Hoffman, Jr. et al. |
| 5,272,638 A | 12/1993 | Martin et al. |
| 5,285,391 A | 2/1994 | Smith et al. |
| 5,467,285 A | 11/1995 | Flinn et al. |
| 5,486,822 A | 1/1996 | Tenmoku et al. |
| 5,519,619 A | 5/1996 | Seda |
| 5,548,773 A | 8/1996 | Kemeny et al. |
| 5,893,081 A | 4/1999 | Poppen |
| 5,938,720 A | 8/1999 | Tamai |
| 5,953,722 A | 9/1999 | Lampert et al. |
| 5,968,109 A | 10/1999 | Israni et al. |
| 5,974,419 A | 10/1999 | Ashby |
| 6,118,404 A | 9/2000 | Fernekes et al. |
| 6,122,594 A | 9/2000 | Tamaki et al. |

OTHER PUBLICATIONS

Weigel, Don, et al, "Applying GIS and OR techniques to solve sears technician-dispatching and home-delivery problems", Transportation/Logistics Services, ERSI, Inc.; interfaces 29: Jan.-Feb. 1999, pp. 112-130.

*Primary Examiner* — Michael J. Zanelli
(74) *Attorney, Agent, or Firm* — Andrews Kurth LLP

(57) ABSTRACT

The invention is directed to a method by which optimal paths are found between one or more start destinations and one or more end destinations. First destination and travel data is converted into a node and edge data format, wherein the nodes represent start points and the edges have a weight related to a travel weight. These nodes and edges are subdivided into subsets. The paths between the start nodes and each of the end nodes are determined using the node and edge representations stored in the subsets. A selected union of subsets is determined that contains the start end destinations. The optimal paths are determined by using the travel values associated with the edges connecting the nodes. The union of subsets, which may comprise less than the full amount of subsets, is loaded for the path determination. Or, when the path determination perceives that a relevant boundary has been reached in a path determination, that next subset in the union of subsets is loaded. The newly loaded subset is "joined" to the already loaded subsets, thus allowing the completion of the path determination.

8 Claims, 10 Drawing Sheets

| | 102 | 104 | 106 | 108 | 110 | 112 | 114 | 116 | 118 | 120 | 122 | 124 | 126 | 128 |
|---|---|---|---|---|---|---|---|---|---|---|---|---|---|---|
| 102 | -- | | | | | | | | | | | | | |
| 104 | 8 | ׀ | | | | | | | | | | | | |
| 106 | | | ׀ | | | | | | | | | | | |
| 108 | | | | ׀ | | | | | | | | | | |
| 110 | | | | | ׀ | | | | | | | | | |
| 112 | | | | | | ׀ | | | | | | | | |
| 114 | | | | | | | ׀ 10 | | | | | | | |
| 116 | | | | | | | | 18 | | | | | | |
| 118 | | | | | | | | | ׀ | | | | | |
| 120 | | | | | | | | | | ׀ | | | | |
| 122 | | | | | | | | | | | ׀ | | | |
| 124 | | | | | | | | | | | | ׀ | | |
| 126 | | | | | | | | | | | | | ׀ | |
| 128 | | | | | | | | | | | | | | ׀ |

*FIG. 2A*

|     | 102 | 104 | 106 | 108 | 110 | 112 | 114 | 116 |
|-----|-----|-----|-----|-----|-----|-----|-----|-----|
| 102 | --  | 8   |     |     |     |     |     | 18  |
| 104 |     | --  |     |     |     |     |     |     |
| 106 |     |     | --  |     |     |     |     |     |
| 108 |     |     |     | --  |     |     |     |     |
| 110 |     |     |     |     | --  |     |     |     |
| 112 |     |     |     |     |     | --  |     |     |
| 114 |     |     |     |     |     |     | --  |     |
| 116 |     |     |     |     |     |     |     | --  |

|     | 110 | 112 | 114 | 116 | 118 | 120 | 122 | 124 | 126 | 128 |
|-----|-----|-----|-----|-----|-----|-----|-----|-----|-----|-----|
| 110 | --  |     |     |     |     |     |     |     |     |     |
| 112 |     | --  |     |     |     |     |     |     |     |     |
| 114 |     |     | --  |     |     |     |     |     |     |     |
| 116 |     |     | 10  | --  |     |     |     |     |     |     |
| 118 |     |     |     |     | --  |     |     |     |     |     |
| 120 |     |     |     |     |     | --  |     |     |     |     |
| 122 |     |     |     |     |     |     | --  |     |     |     |
| 124 |     |     |     |     |     |     |     | --  |     |     |
| 126 |     |     |     |     |     |     |     |     | --  |     |
| 128 |     |     |     |     |     |     |     |     |     | --  |

DATA SET F VALVE MATRIX

|     | 400 | 402 | 404 | 406 | 408 | 410 | 412 | 430 |
|-----|-----|-----|-----|-----|-----|-----|-----|-----|
| 400 | --  | t1  | t2  | t3  | t4  | t5  | t6  | t7  |
| 402 | t29 | --  | t8  | t9  | t10 | t11 | t12 | t13 |
| 404 | t30 | t31 | --  | t14 | t15 | t16 | t17 | t18 |
| 406 | t32 | t33 | t34 | --  | t19 | t20 | t21 | t22 |
| 408 | t35 | t36 | t37 | t38 | --  | t23 | t24 | t25 |
| 410 | t39 | t40 | t41 | t42 | t43 | --  | t26 | t27 |
| 412 | t44 | t45 | t46 | t47 | t48 | t49 | --  | t28 |
| 430 | t50 | t51 | t52 | t53 | t54 | t55 | t56 | --  |

FIG. 6A

DATA SET G VALVE MATRIX

|     | 414 | 416 | 418 | 420 | 424 | 430 |
|-----|-----|-----|-----|-----|-----|-----|
| 414 | --  | t57 | t58 | t59 | t60 | t61 |
| 416 | t72 | --  | t62 | t63 | t64 | t65 |
| 418 | t73 | t74 | --  | t66 | t67 | t68 |
| 420 | t75 | t76 | t77 | --  | t69 | t70 |
| 424 | t78 | t79 | t80 | t81 | --  | t71 |
| 430 | t82 | t83 | t84 | t85 | t86 | --  |

FIG. 6B

DATA FORMATS AND USAGE FOR MASSIVE POINT TO POINT ROUTE CALCULATION

CROSS REFERENCE TO RELATED APPLICATION(S)

This is a Continuation of application Ser. No 09/790,333 filed on Feb. 22, 2001, now U.S. Pat. No. 7,050,904. This application also claims priority of application No. 60/184,186 filed on Feb. 22, 2000, both applications which are hereby incorporated by reference in their entirety.

BACKGROUND OF THE INVENTION

1. Field of the Invention

The present invention generally relates to a dynamic mapping and scheduling apparatus and method. In particular, the present invention relates to such a mapping and scheduling system that may be employed in a computerized and/or networked environment, and employs multiple subsets of weighted path data.

2. Description of Prior Art

Many typical mapping and scheduling systems determine a schedule or time of arrival based upon the lengths of arcs between several points. In this manner, these systems employ data representations of points and paths as nodes and edges. This scheduling is applicable to many different applications, including shipping, delivery routes, airline or other transportation schedules, computer networks, electrical grids, or other natural resource delivery grids.

Typically, a geographic area has many of these nodes and edges. The nodes and edges typically denote, for example, intersections and roads or pathways, respectively. A representation of the intersections and roads or pathways for a particular small or low data density geographic area may be manageable. But when the number of nodes and edges is large, say as in a high density metropolitan area or in a large geographic area, the determination of scheduling and mapping the paths between the points may be an enormous task, due to the large number of possible node-edge computations.

In fact, when mapping an n-point travel matrix, the number of travel values in an optimal routing matrix is n*n (n squared.) This complexity makes the mapping of travel times in large numbers problematic.

Additionally, the load time for these huge problems is also quite large. Building a nodal network linked by weighted paths for a 500,000 node network map is daunting.

Some travel time determinations use coarse solutions, thus decreasing the numbers of nodes and edges. In this case, only major thoroughfares and roads are used in a "fan-out" type computation, and approximations as to specific points are used. This greatly reduces the computational load, as the numbers of edges and nodes are reduced. However, this approximation lends to inherent error in the travel times, since the edges are not completely modeled and since the node locations are only approximated. This is exemplified in travel and transport determinations used in grid-to-grid calculations, which don't even use edges or roads. This problem is also typical in systems utilizing scheduling or travel values based on zip code.

In these cases, specific travel times or distances are not determined with the accuracy associated with solutions characterized by highly populated node and edge systems. However, these coarse solutions do offer the ability to encompass solutions for large regions, at the expense of accuracy.

Additionally, these coarse solutions cannot employ explicit path determinations. Nor can they employ bi-directional modes, wherein different travel values can be shown depending on direction of travel. This may be important when dealing in areas having numerous one-way routes.

As such, many typical travel time solutions suffer from deficiencies in providing accurate solutions. Others, using an opposite approach, suffer in computational size and speed for large detailed solutions. Many other problems and disadvantages of the prior art will become apparent to one skilled in the art after comparing such prior art with the present invention as described herein.

SUMMARY OF THE INVENTION

Various aspects of the invention may be found in a mapping system that formats road data into a node and edge representation. Further, the nodes are grouped by distinct data sets.

Additionally, the distinct nodal network can be determined in a set-by-set basis. In this implementation, a subset of the group of sets is chosen such that at least two selected nodes are present in the set. Weighted paths are determined between the nodes in the sets.

Then, a new node is chosen as the center of a new extent, and a new subset of the larger set group is determined. This new subset may include sets of data used in the previous determination. These already used sets are still accessible, and thus not released. Sets in the older subset that are not in the newer subset can be released. In this manner load times are increased for the computation of the weighted paths.

In this manner a weighted path nodal network is derived. From this nodal network, an optimization may occur to determine the least weight travel value matrix.

Paths between the sets are enhanced by the use of dual nodes representing the edge nodes. In this aspect, assume a node exists on the boundary of two data sets. In each data set one other node has an edge to that boundary node. In the first set, the node is represented as having at least one edge, one going to the representation of the same node in the other set and having a edge path length. This enables the process to determine path weights across the set boundary. In short, the boundary node is thought of as two overlapping nodes, each existing in the other set and having a zero-length edge connecting to the other corresponding node in the other set.

By grouping the data by sets, various sets may be managed by a data set manager. When a client asks for one set to be included in its solution, the data set manager determines whether it is already in use. If not, the data set manager loads the data set into use.

If another process asks to use the same data set, the data set manager simply allows the second process to use the data set. Only when all processes are no longer using a data set does the data set manager pull the set out of use. In this manner, space and time is preserved in processing using common data sets.

Additional aspects of the invention are found in a data set determination. Extents are overlaid on the data set information. When the extents indicate that particular data sets are determinative for an optimal solution, the appropriate data set is loaded. Conversely, when a data set is no longer needed, the process then may allow the set not to be used.

Other aspects, advantages and novel features of the present invention will become apparent from the detailed description of the invention when considered in conjunction with the accompanying drawings.

BRIEF DESCRIPTION OF THE DRAWINGS

FIGS. 2A through 2C are matrix diagrams showing the relationships between the points of data as shown in FIG. 1.

FIGS. 3A through 3E are a series of figures diagramming the determination of the weighted path values and the path attributes, and the determination of the specific sets to be used in an optimal calculation according to the invention.

FIGS 6A-6B are diagrams detailing the matrices derived from the subsets defined in FIG. 5.

DETAILED DESCRIPTION

Figure 1A:
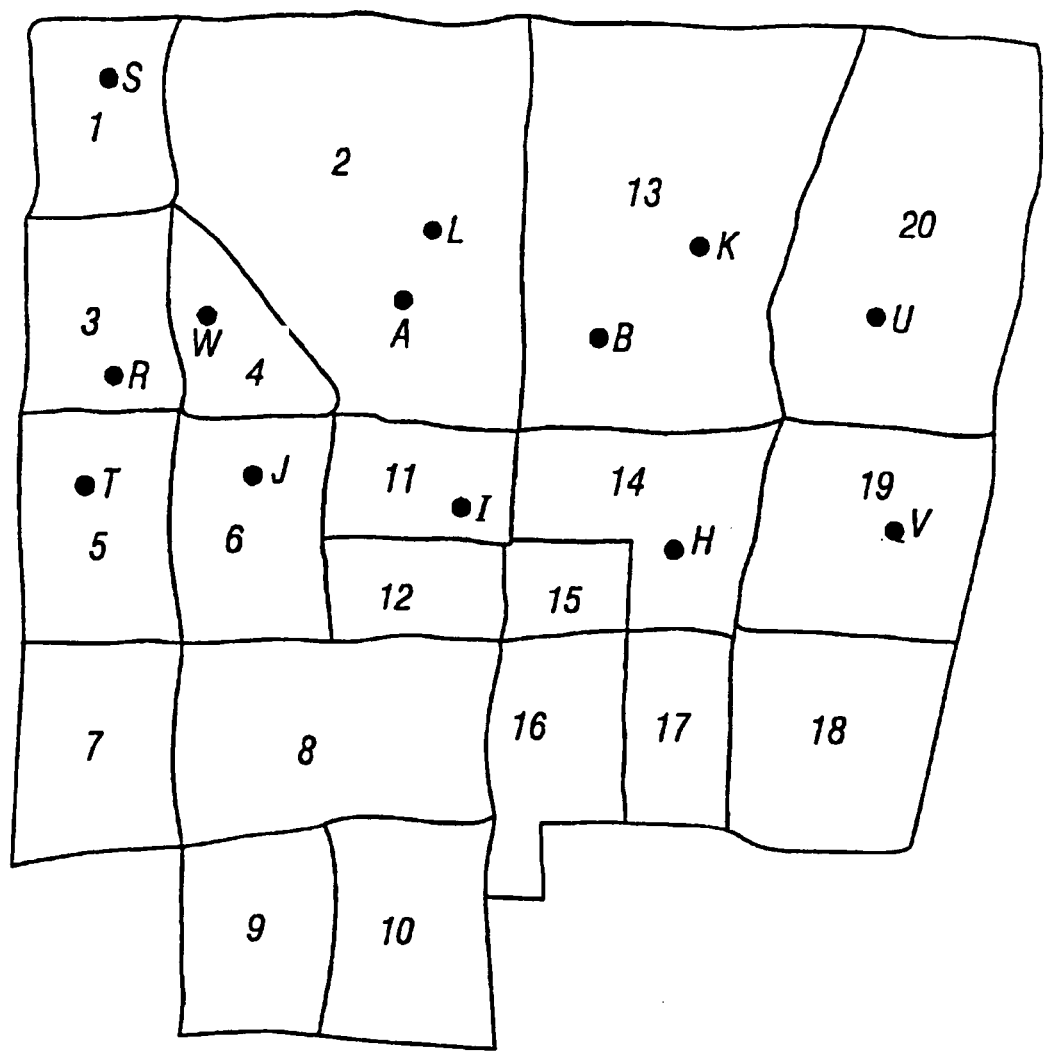
FIG. 1A is a geographic representation of a nodal network in a geographic context, showing the nodes in several different data sets, as used in the invention.

In the present invention, transit data is converted to weighted path information. The weighted path information is then optimized. This may be by, for example, a modified Dijkstra shortest path algorithm to determine optimal transit times given a specific road network. For purposes of the invention, the nodes translate to sources and destinations, and the weighted paths are associated with formatted data structures that indicate path information on the road network, as well as travel value weights.

In a geographic example, roadway information may be in a TIGER format and converted to a format easier to work with, such as that described later in this document. Or, other network information formats may be converted, such that the information may be represented in an edge-node fashion.

It should be noted that any delivery, transit, or network topology might be converted to such node and edge topology. In this manner, all number of transit systems may be included by reference in specification, and the discussion of the invention uses a geographic context solely for illustrative purposes.

In order to maintain scalability, the travel information in a particular area is predetermined. That is, the travel values among the various nodes are preprocessed.

One problem facing the determination of optimal travel values is the loading of huge amounts of travel data. In many systems, this may exceed several hundred thousand nodes and an approximately equal number of edges. Or, the numbers for computer networks may be dramatically higher.

In one aspect of the invention, the full set of nodes and edges are broken down into subsets and stored separately. When attempting to solve for the optimal travel time between a full set of nodes, the full set is not used. In a systematic fashion, each area around a particular node is loaded into the system, and weighted paths are determined for each node pair that exists in that particular subset.

Then a new node is selected. While the data sets of the first subset have not been released, a second subset of the full data is determined for processing relative to the new node. Individual data sets that exist in the first subset are maintained in the processing. Data sets in the first subset that are unused may be released. If any new data sets are needed to complete the second subset around the new node, they will be individually accessed and loaded.

With the new subset, weighted paths are constructed between the new node and any nodes that exist in the new subset. When this is finished, another node is selected in the network and the process renewed, wherein data sets common to the previous determination are retained and unused data sets are released.

This continues until all the nodes in the nodal network have been processed. At the conclusion, a weighted path has been constructed from which an optimization may take place. It should be noted that this may take place with a single start node, multiple start nodes, or any other nodal sets that may be defined or relevant.

It should be noted that during this construction of the weighted pathway, not just the value of the weighted path is constructed, but a fully linked representation of the pathway may be constructed, noting precisely which nodes and edges in the full data set have been selected. This linked representation may be associated to the weighted path, such that when and if that path is selected in the optimization step, it may be fully realized. In the case of a geographic system, this may be used to fully integrate a street-by-street and intersection-by-intersection travel path for a particular travel path. Mapping technologies may then be employed to provide a full path map base on the underlying data.

Further, many communities provide real time access to traffic data. In this case, such data may be accessed on a dynamic basis and used to modify the static set information. For example, many highway departments maintain electronic flow rate measurements for highways and roads. Or, many communities provide listings on road closure and stoppages based on construction or repair. Additionally, intersection controls such as traffic lights may be electronically monitored and such information on light scheduling or malfunctions may be used to dynamically update the travel values. In this manner, the data sets may be overlaid with dynamically updating information prior or weighted path determination.

Additionally, optimal paths can also be preprocessed among nodes in and on the edge of the data set. In this manner, optimal routings within the data set are preprocessed, and optimal routings to nodes within the data set from boundary nodes are also known. In this manner, the set data may be linked easily to other preprocessed set data adjoining each set. In this manner, highly efficient yet highly accurate determinations of path values may be made within and across sets.

This means that an area is defined, and if the processing engine for a solution needs the area, then that area is accessed. If the area is not determinative for a solution given the particular defined path nodal network or sub-network, the information for that area is not included in determining the optimal path solution.

As such, area information is selectively included in the solution of the optimal travel matrix only when needed, and as determined by the system. When not including such area information, vast amounts of computation steps and storage are saved. In this manner, the entire network of data points need not be computed each and every time a solution is needed.

FIG. 1A is a geographic representation of a nodal network in a geographic context, showing the nodes in several different data sets, as used in the invention. It should be noted that each data set might consist of several thousand, tens of thousands, or maybe even hundreds of thousands of nodes and edges. As such, the complete data representation may be for several times a set size. To load the entire set into the solution would take enormous resources.

However, in this case node A is selected as the base node. The data set containing node 1 is loaded, as well as several neighboring data sets. In this case data sets 1, 2, 13, 14, 11, 6, 4, and 3 are loaded into the solution. A one-to-many algorithm is run that will link node A with as many nodes that are contained in the previously mentioned sets. In this case, the weighted paths for node pairs (A,L), (A,S), (A,R), (A,W), (A,J), (A,I), (A,H), (A,B), and (A,K) are made.

Next, node B is selected as the next focus node. Neighboring data sets are determined for this node. These new data sets that will be analyzed to prepare the next set of weighted values are the data sets 2, 13, 20, 19, 14, and 11. The data sets 2, 13, 14, and 11 are already available to be processed. The process needs only retrieve sets 19 and 20 to perform the weighted path determination.

The data sets 1, 3, 4, and 6 may then be released. This saves the amount of storage space needed in the calculation, and also save computational load in the one-to-many determination.

However, if another client has a need for the released data sets prior to them being released for the second weighted path determination, the other client need not reload those sets. The other client may use the sets. If this happens, and the second client is still using the sets that the second weighted path determination determines that it may release, the second client's usage can prevent those sets from being released. Only when any client is not using a data set would it be released from storage.

Figure 1B:
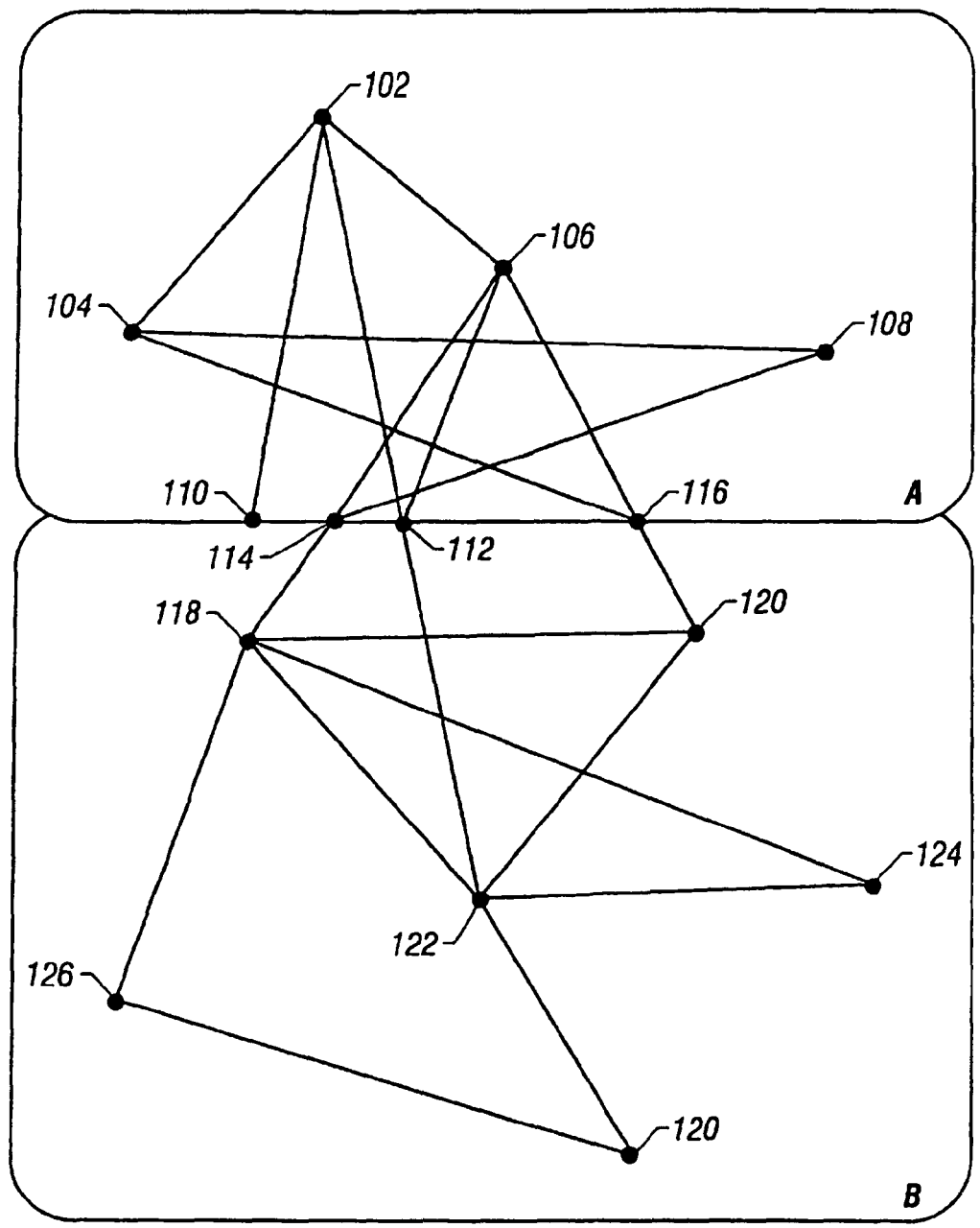
FIG. 1B is a geographic representation of a travel network as used in the invention.

FIG. 1B is a geographic representation of a travel network as used in the invention. In this case 10 different points (locations) are represented with the interconnections thereof. The interconnections, or edges, represent the travel times between the different points in the system. These weights indicate a particular weight used in the least weigh solution for the system.

In the current invention, the number of computational steps, and the number of current steps is significantly reduced when the areas are defined and possibly evaluated. In one embodiment of the invention, the detailed data set of edges and nodes is subdivided into data sets. Each travel value or transit time for the data set is computed for the associated nodes and edges in the data set. For example, in FIG. 1B, data set A contains the data points 102, 104, 106, and 108. The transit values, corresponding in this case to travel times between the associated nodes, are predetermined. In this manner, much of the underlying computational work is performed prior to the actual determination of the optimal travel values. In this manner, the travel values corresponding the weighted values of a path between the points (nodes) in a data set may be determined to a very fine level or to a coarser level local to each set, when the set is needed. As such, the data set A contains the relevant information for the nodes (points) and travel values (edges) between all the points 102 through 108.

Additionally, the solutions based on sets allow a full matrix solution to be stripped down. For example, if the edges of a set are known, and only the paths to 2 or 3 points in the set need to be found, the pathways coming from outside may be determined in a simple fashion then through additional of the set to an already existing set.

If one were to add the full set to the existing set, this would increase the computational complexity of the solution tremendously. However, if the paths from the edges of the set are optimized on a local level, then existing optimal solutions to nodes on the edge simply add the optimal local solution, rather than computing a dramatically increased set size.

Each point or node represents an intersection of a road or thoroughfare; points on the edges of the data sets represent intersections of those roads or thoroughfares. Additionally, the intersections (nodes) may also be used to bind the various data sets, as will be explained later in this document.

In this manner, many different data sets may be predetermined and bound together. This allows for scalable and quick processing of weighted paths among the data sets, without loading the entire population of data into the processing system in massive matrix or nodal computations.

As mentioned previously, each intersection (node) of the data set represents an intersection of thoroughfares, and as such travel times (edges) represent transit values associated with the transits between those intersections. Thus the solutions inherent in the weighed paths translate directly to the real world, and in turn to the converted map data.

These predetermined transit value sets are stored separately from one another, and are loaded as needed by the computation. If a computation only needs the data in one data set, only that data set is loaded and made available. Without going into detail until later in this document, paths may be made across multiple data sets through the use of overlapping nodes. As such, weighted paths may be determined across multiple predetermined data sets, and the data sets are made available as needed. In one embodiment, multiple clients may simultaneously access loaded data sets. In this case, a paging mechanism may be employed to determine whether to load or unload particular travel value data sets.

In this manner, only the predetermined data actually needed to perform a weighted path determination is loaded and made available. Due to the limited manner in which the data is made available, the size needed for and speed of the computation is thus correspondingly reduced.

Accordingly, travel times can be determined for any two points within the data set A, (such as the edge between point 102 and 104), a point on the edge of the data set and any interior point to the data set (the path between the point 102 and the edge point D, not shown), or any two points on edges of the data set (such as the path between point A and point E, not shown). Using these local travel values, optimal solutions may be easily mapped internally within the set since the set is by definition data limited relative to the entire population.

Or, the optimal solutions from node on the edges to specific internal nodes may be mapped onto other data sets with solutions loading to the same edged node. In this case, optimal set-to-set solutions may be computed by adding optimal solution on such anchored edge nodes. In any case, this takes for less computational power and storage than solving for the fully populated two sets of nodes.

Figures 2B, 2C, 3A:
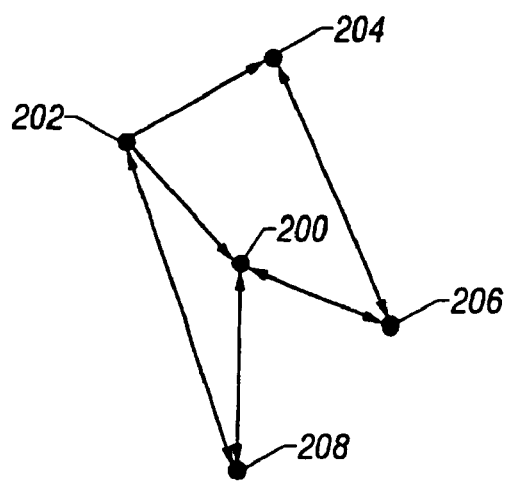

FIGS. 2A through 2C are matrix diagrams showing the relationships between the points of data as shown in FIG. 1B. In this example, the travel time between points 102 and 104 is 8 minutes. This corresponds to the edge between 102 and 104 in data set A, FIG. 1B.

Additionally, FIG. 2C shows that the transit time from node 116 to node 114 in FIG. 1B is has a weight of 10 minutes. In this manner a transit time from an edge node of the data area to an interior node is determined.

Additionally, the entry in the matrix shown in FIG. 2B in the Column denoted by Point 102 and the row denoted by point 116 indicates an optimal travel time of 18 minutes. Thus, it takes 18 minutes for an optimal transit from Point 102 to Point 116 in data set A. In this way, the traverse of data set A from point 102 to point 116 takes 18 minutes.

As stated before, these travel times are predetermined on a data set basis. While FIG. 2B shows the results for data set A, similar predeterminations of transit values are made for the other data sets noted in FIG. 1B as well, including the nodes existing on the edges or borders of the data sets.

The comparison of FIG. 2A with that of FIGS. 2B and 2C indicate the savings of computation space when the points are split into data sets. In this example, the space needed to represent the optimal times is reduced.

The transit times for each edge in each data set is predetermined, including those interior linking nodes to border data nodes, and those linking interior nodes to interior nodes. In this manner, each data set may be accessed for transit data from interior nodes to border nodes, from interior nodes to other interior nodes, or from border nodes to interior nodes, or to traverse the set transit data from border nodes to other border nodes.

Figure 3B:
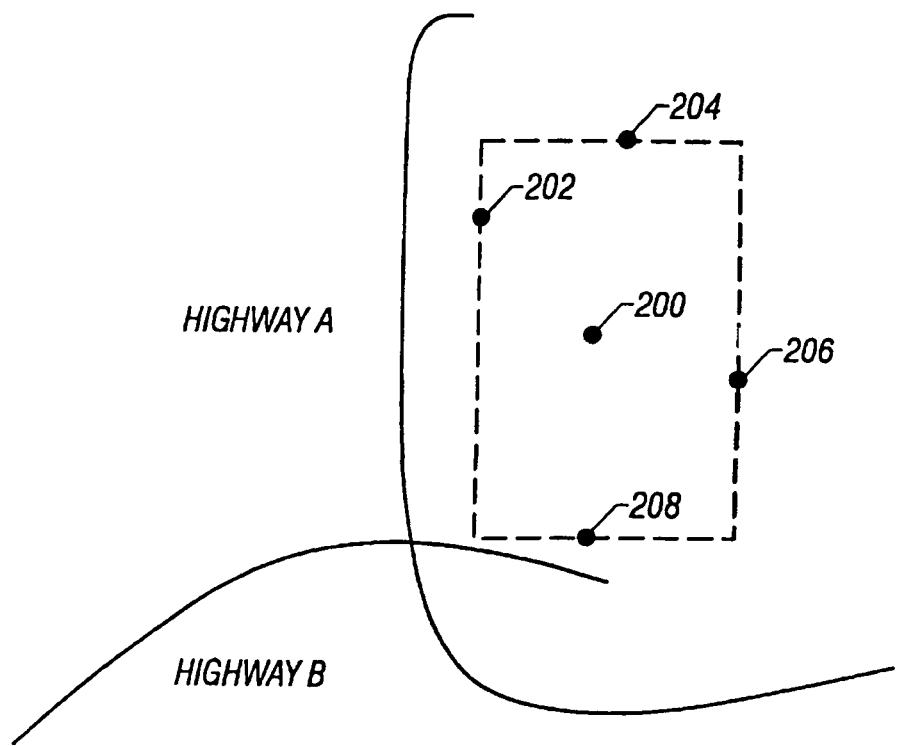

FIGS. 3A through 3E are a series of figures diagramming the determination of the weighted path values and the path attributes, and the determination of the specific sets to be used in an optimal calculation according to the invention. In FIG. 3A, the nodes 200, 202, 204, 206, and 208 are selected as the nodes for a network solution. In FIG. 3B, the smallest extent that encloses the nodes or contains the nodes on its boundary is selected. This extent is labeled E.

In order to accommodate faster thoroughfares such as highway B that may run outside the actual bounding extent, an outer boundary is added to the bounding extent in FIG. 3B. It should be noted that in the diagram the bounding extent is rectangular in shape, any geometric form may be used, such as a circle, oval, or any other closed shape.

Figure 3C:
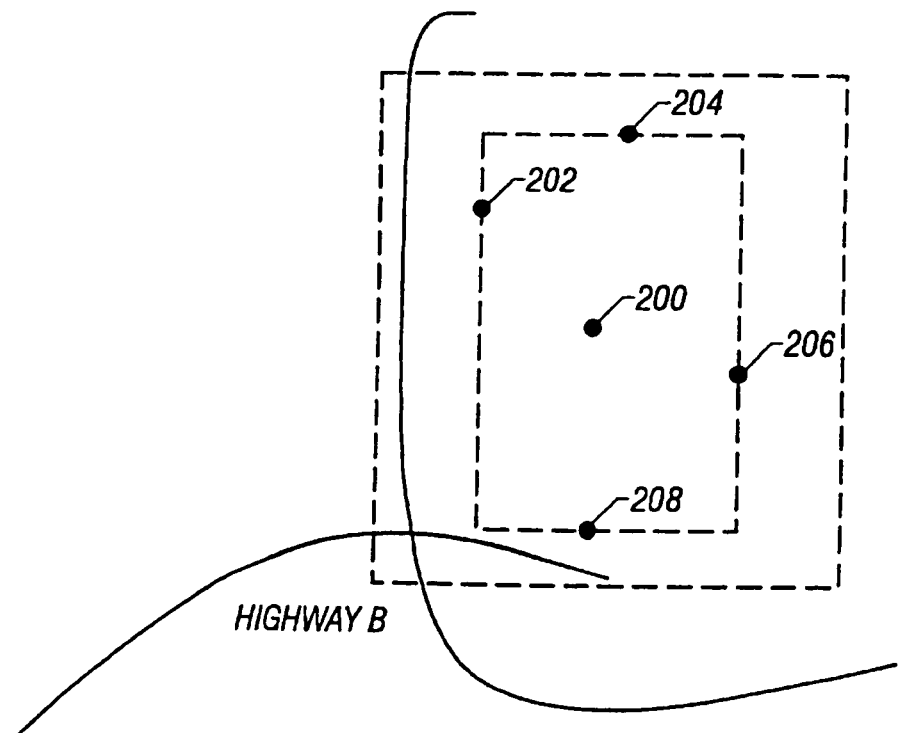

For each node in the network, a secondary extent is formed around it, such as that shown as 202 in FIG. 3C around node 200. The intersection of the first bounding extent and the secondary bounding extent defines an area in which the road and weighted path data will be analyzed.

The extent should be sufficient so that at least one other node on the network is included. In this manner, a path may be formed between the two points with the proper weighting. This also ensures that the point is connected to the rest of the network.

Figure 3D:
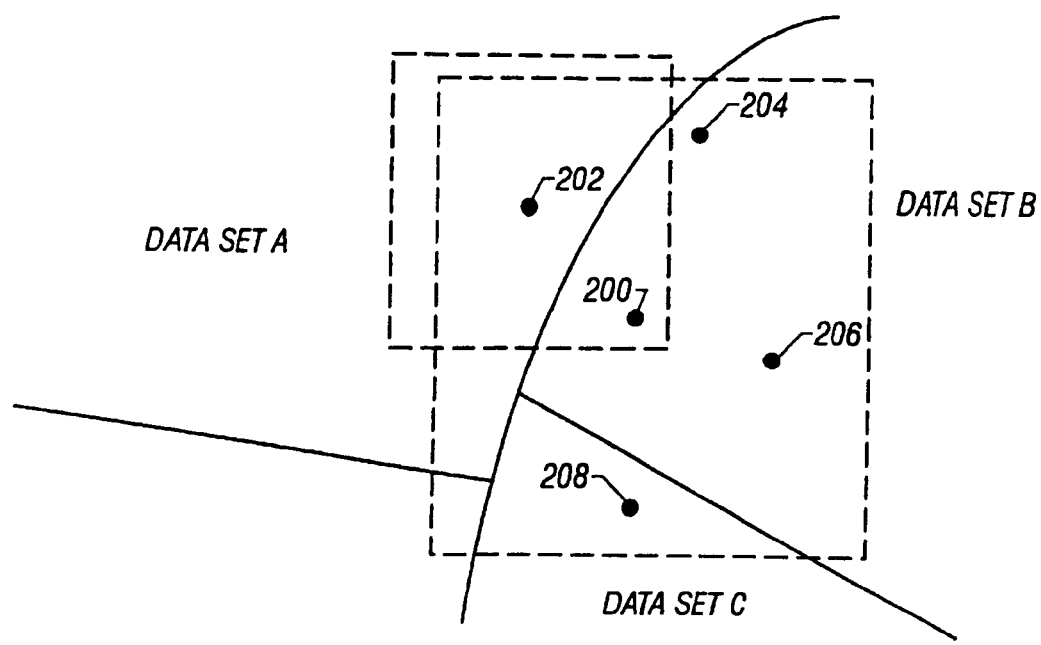

A request is made for the preprocessed road network data in the areas contained within the intersection of the extents. In this case, the road information in data sets A and B will be analyzed. If the extents were as shown in FIG. 3D, the road information for data sets A, B, and C would be examined to determine the optimal path.

For each of the network nodes within the intersection of the extents, both a weighted path would be computed, as well as the path attributes of that path. The weighted path could be determined using the Dijkstra algorithm, ensuring that the optimal weighted paths from the various nodes would be maintained. This means the shortest path for both interior-to-interior paths as well as border to interior paths. The algorithm would use the predetermined travel values stored in the appropriately loaded data sets for computing the least weighted paths. As stated before, other types of optimization steps may be employed with this concept.

Upon determining the weighted path between the network nodes, the actual path characteristics may be determined from the predetermined data. Concurrently while determining the least weighted path in the nodal network in the data set, the process would build a representation of the actual path characteristics in that data set. As such, both the path weight and characteristics are determined. In this manner, both a path and a path value are determined between each defined node.

A path attribute is recorded for each destination node that falls within the extent intersection. In one embodiment, nodes that fall outside the extent intersection are not computed. In the case of FIG. 3D, a path attribute and weight is determined for the path(s) between node 200 and 202. This plural is used because bi-directional weighting may vary between nodes.

Figure 3E:
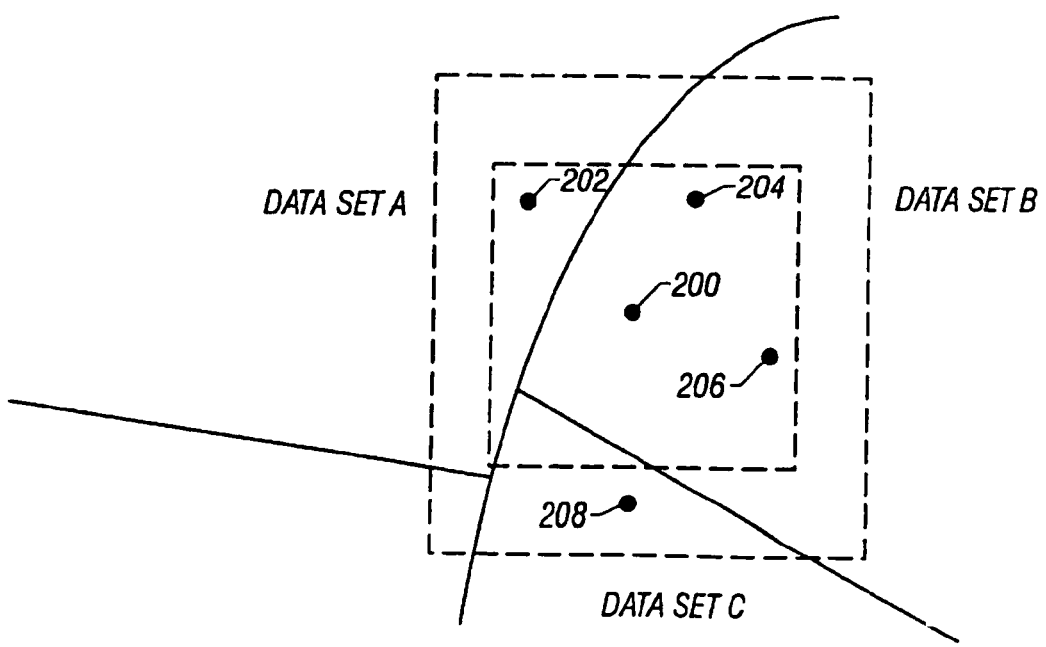

In the case of FIG. 3E, path attributes would be computed for node pairs 200-206 and 200-204. In one embodiment the path attribute for node pair 202-200 is not calculated, since one exists prior to this and need not be recalculated.

In one embodiment, the pairs 202 and 204 would be recalculated, as well as that for node pair 206 and 204. However, this need not be done.

In a similar manner, each successive node is processed with overlaying the secondary extent against the first. Eventually, a multi-path nodal network is created among all the selected nodes in the network.

Each node in the nodal network has at least one path to it, and may have several paths directly computed. In this manner a node and edge network is created, such that the Dijkstra least weight algorithm may be used on this constructed nodal network to perform optimization on a travel network.

The path data associated with the weighted edges may be accessed to gain actual path information on the weighted path. In this case, this is derived from the predetermined road data, described above. The data sets are selectively accessed according to the defined extents, and the information is used to construct a weighted path between the network nodes. Additionally, the path information is associated with the weighted path as it is constructed.

Each network node is processed in a similar manner, and a network of nodes linked by weighted paths is constructed. This network is in turn processed to find the least weight path through the entire network. The path information is still associated with the weighted path. As such, both a least weighted analysis of the defined network is performed to determine the optimal path from the various defined nodes, and specific path information is constructed and associated with that weighted path. Additionally, in the course of determining the weights of the paths, specific path information is associated with the path in the form of streets, thoroughfares, and intersections between the defined network nodes.

To aid in reducing the scale of the computational aspects, the original data set is broken down into subsets that are selectively loaded according to the relative position of the nodes in the network, and as those nodes are computed in the network.

As such, the actual path finding algorithm operates on subsets of the whole data, rather than on the entire set at once. As mentioned before, this greatly reduces the complexity and scale of the process.

Figure 4A:
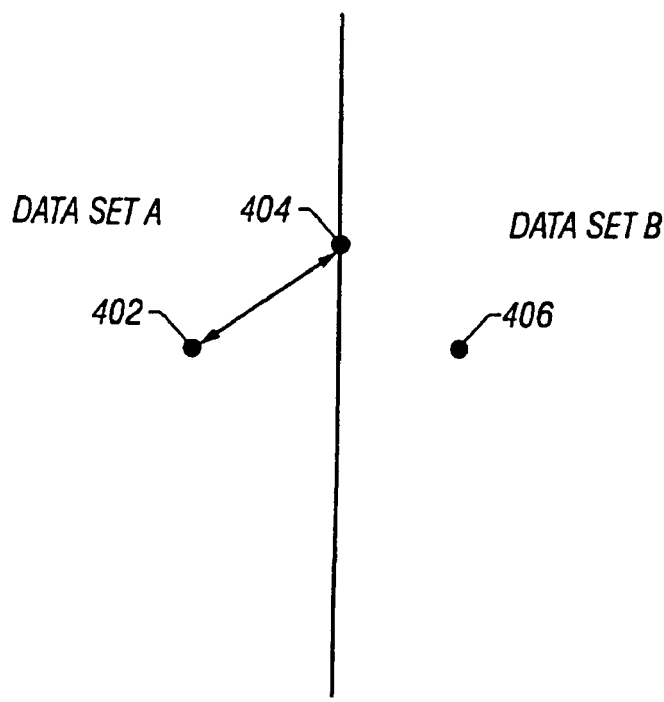
FIGS. 4A-4C are set representations detailing two data sets with common nodes at their boundary.

In order to aid the computation across data set boundaries, nodes at the data set boundaries exist in both data sets. FIG. 4A is a set representation of two data sets with common nodes at their boundary. Set A contains the nodes 402 and 404. Set B contains the nodes 406 and 404.

Figure 4B:
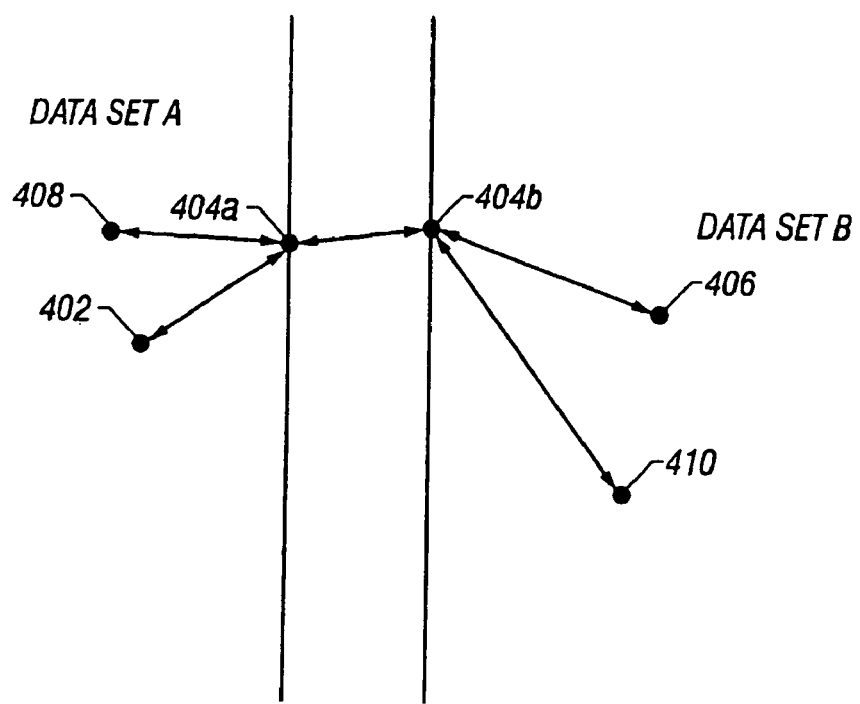

To accommodate nodes existing on edges, a representation is made within each set that refers the common node to itself, so to speak. FIG. 4B is a set representation of the implementation of common nodes on boundaries, according to the invention. In this case, two different nodes, namely 404A and 404B, represent point 404.

Inherent in set A, node 404A contains three edges. One each to the two interior nodes, and one zero length edge to the related node in the other data set. In this manner the path between the sets is maintained and linked through the zero length edge. Relatedly, node 404B also contains three edges, namely, one for each point in the Set B, and another that is an edge relating to node 404A in Set A.

In order to aid the computational aspects of the invention, the nodes 404A and 404B are assumed to be overlapping and connected via an arc length of zero. In this manner a weighted path may be constructed between data sets, the links maintained between the nodes, yet no computational inaccuracy is introduced into the system when the process operates across set boundaries.

For example, the weighted path between the nodes 402 and 406 would be the sum of all the intervening arc lengths between them. As such, the arcs (402->404A)+(404A->404B)+(404B->406) would be added together. Since the arc length of 404A->404B is zero, the sum of the lengths would be the sum of the remaining arcs as defined in the path information.

The use of the zero length arcs to the various data sets together also simplifies the task of determining optimal paths into and across data sets. As the number of data points grows in a set, the number of computations to determine point-to-point path values dramatically increases as the size of the set increase. Additionally, storage needs for these calculations also increase rapidly as the set size increases.

Figure 4C:
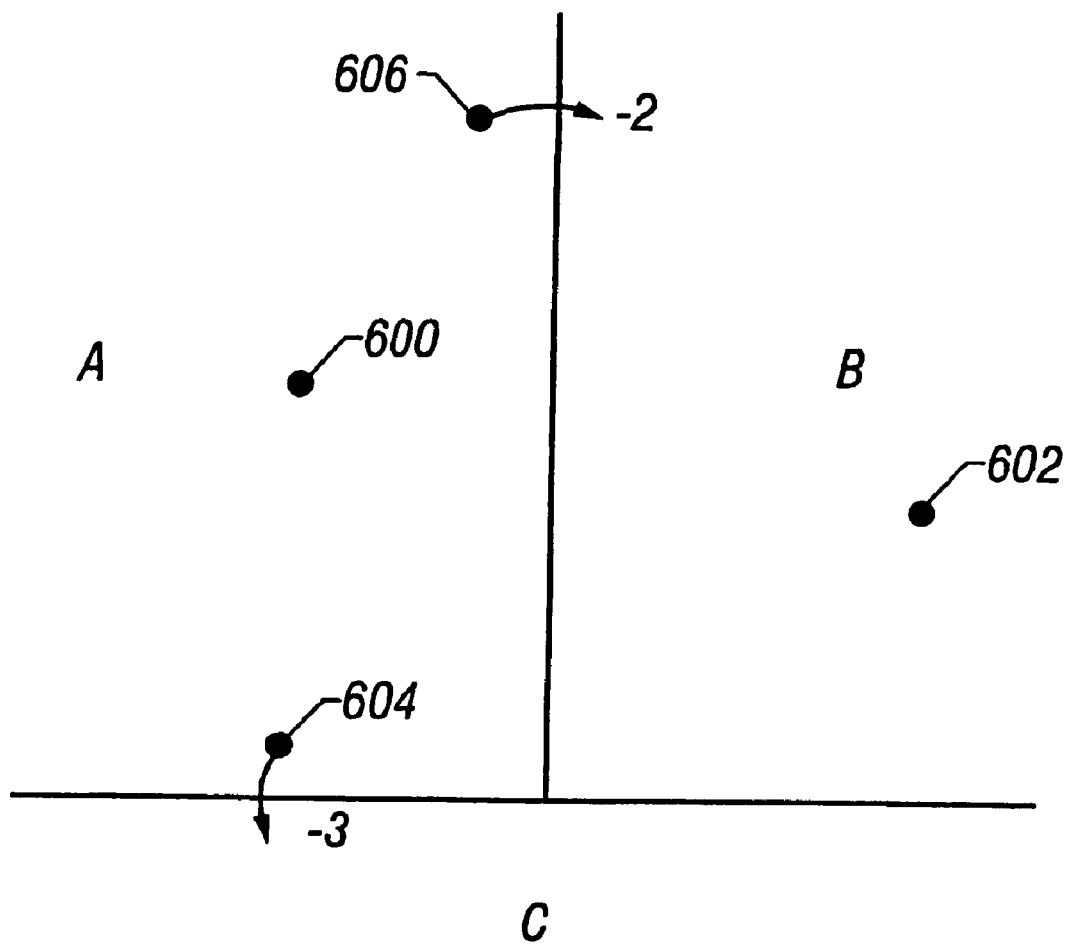

Additionally, other information associated with the zero length flags may be used for other informational purposes. In FIG. 4c, the data set A is bounded by the data sets B and C. Assume that the nodes 600 and 602 are involved in an optimization determination. Obviously data sets A and B would be included in the relevant set, while set C would not.

Upon determining the path weight or other optimization routine involving path tracing through edges, the routine encounters the node 604 bounding sets A and C. The value of the arc may be set to some value that indicates which set it links to. In this case assume that a value below zero indicates linking to a border node, and the actual value indicates to which set the corresponding node is in. In this case the arc length is negative 3 (−3), indicating both a physical zero weight, and the value of the negative number indicates that it is reaching into set C. The algorithm should stop any processing into node C since it will not consider nodes in set C. Since the flag indicates a traversal into node C, the algorithm should not perform the processing into node C.

In this manner, the path lengths may indicate traversal into another data set. Additionally, the nodes may be used not to just join sets together, but may be used to overlay one type of data set to another.

Correspondingly, the node 606 contains a weight of negative 2 (−2). The negative number indicates a border node with a zero weight, and the value of the negative numeral indicates that it has a corresponding border node in set B. In this case, the algorithm would continue to perform the optimization step into set B, since it would be proper to do so.

By limiting the data sets used in the computation through the extents, this reduces the total field of points enormously. Additionally, each additional data set is processed individually up to and possibly through the border nodes. The zero length arcs link the processed smaller data sets algebraically. This also saves tremendous resources, both in computing and in storage.

Figure 5:
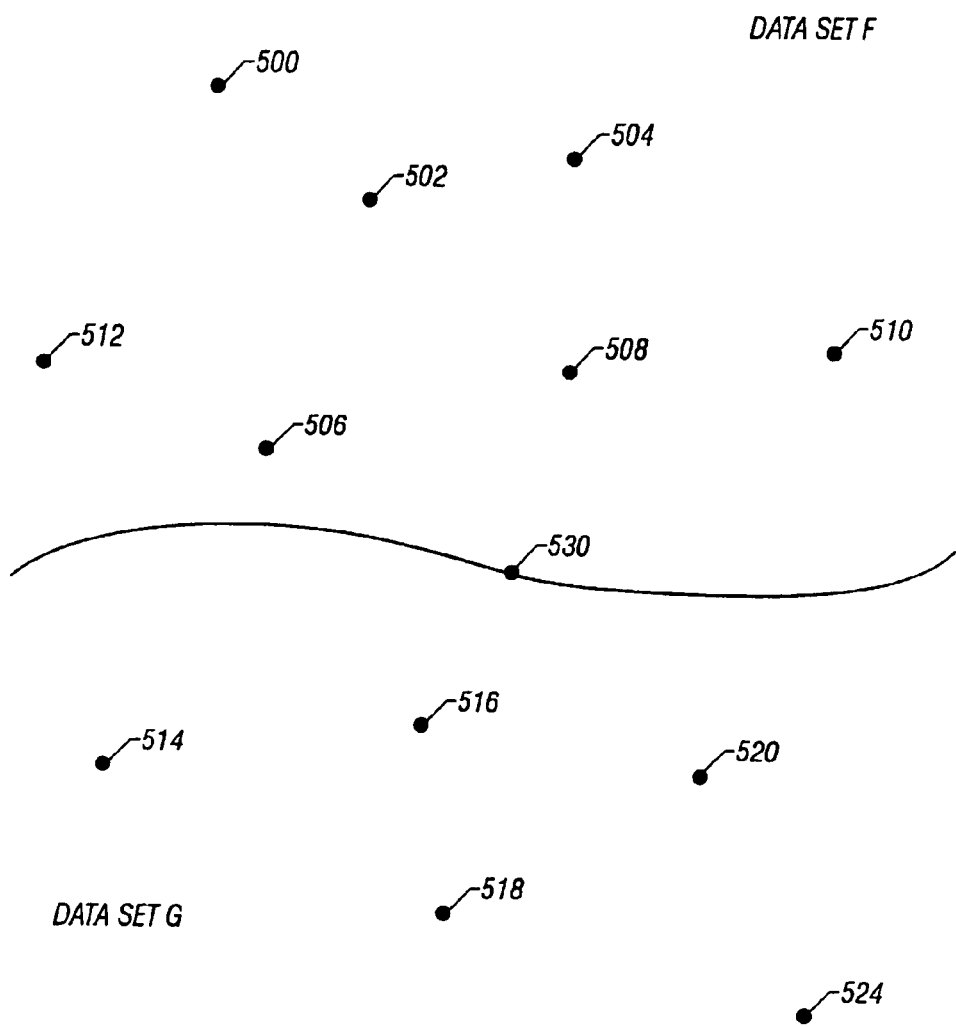
FIG. 5 is a set diagram detailing the subsets of a nodal network diagram and their interrelationships.

For example, assume that a nodal network was to be computed according to FIG. 5. There, the nodes 500, 502, 504, 506, 508, 510 and 512 exist in data set F. The nodes 514, 516, 518, 520, and 524 exist in data set G. Also assume that the node 530 connects the data sets F and G.

In a typical implementation, a 144-point (12×12) matrix would contain the optimal travel times for all the nodes in the network. Instead, the same travel information the network may be represented by a 36-point (6×6) matrix containing the optimal routes for the points in the data set G along with the border node 530. The travel information for data set F may be represented with a 64-point (8×8) matrix representing the travel times associated with data set F and the border nodes. These matrices are diagrammed in FIG. 6A & 6B.

Any path length from set F to set G may be obtained by simply summing the appropriate paths in the matrices. For example, if an optimal travel value for the path between 502 and 514 is needed, one sums the path value of the network value 502->530 with that of 530->514. In this case the operator A->B represents the value of the matrix element corresponding to the computed optimal value of the weighted paths having a source of node A and a destination of source B.

Since the sizes of the matrices grow with the square of the number of data points, the savings are substantially larger as the data set size grows. This aids both in storage and computation time Linkage of the information contained in the predetermined road data may be accomplished through the use of data formats. Structure exists in a node and edge diagram. One embodiment envisions the structure of a node and edge diagram. The nodes consist of the nodes V1, V2, V3, V4, and V5. The segments e1, e2, e3, e4, e5, and e6 are edges.

Information that is available on any node includes the geographic coordinates, such as longitude and latitude, as well as the number of edges connected to it. In the case of a node included on the boundary if a data set, an extra edge is included indicating the zero length edged connecting the node to the other data set via the overlapping node contained in that other data set.

In another embodiment, specific information on the shape of the edge is included. This information may contain such data as number of segments in the edge, points of the segments in the edge, lengths of each segment in the edge, and/or offset angles of each segment in the edge.

The concept of an address as the actual start and destination node in the ultimate nodal network flows from this embodiment, since addresses do not necessarily exist at nodes, which represent intersections. However, the concept of a node with one or more segments, each with a possible length, direction, or relative position to the node can delineate quite accurately a specific address in the road information. In this embodiment, quite accurate results in the weighted path determination of the optimal solutions, as well as specific path information to and from an address is possible.

Additionally, the edge information may contain data on the specific direction of the edge. In this manner, bi-directional network models may be implemented. This would take in account such things as one-way streets for the road information.

Other additional information regarding the edges may contain such information as the number of lanes, the particularly types of routes, or the presence of traffic signals. Additionally, specialized routing could be implemented using these fields. Assume that one wished to only travel four lane roads. This parameter could be used to restrict the actual recording of the path information and weighted path as mentioned above.

Additional gains in computation may be made in the use of predetermined data blocks, as described above. For example, only selected data blocks containing source nodes, destination nodes, or border nodes need be accessed. In this manner, much of the inherent data may sit idly by, and only those portions of the data are used on an as-needed basis.

According to one aspect of the invention, two or more independent processes determine path information for defined networks across geographic data sets. The processes may be defining travel time matrices for the same defined network, or may be processing travel value data with completely different defined networks.

Assume that the process 1 starts and needs to process a path data using predetermined data sets A, B, and D. A data set manager determines the appropriate data sets and loads them into an accessible memory wherein the data within them may be processed and used.

Assume that while the process 1 is running that a process 2 starts. The process 2 determines that it needs the predetermined data sets A, B, and C to process a portion of its network solution, and as such requests the data set manager to load the appropriate data sets. The data set manager determines that the data sets A and B are already in use and accessible. The data set manager then makes the already loaded data sets A and B available to process 2, and proceeds to load the data set C. Upon loading data set C, the system may then start to process the network solution for process 2.

In this manner, the predetermined data sets may be loaded as needed. Once loaded, other processes may access the data sets. As such, loading times are decreased since the data sets are already in use and accessible.

Assume that another process, process 3, is initiated and needs data sets B and C to perform a network solution. Since both data sets are already loaded and available, the process 3 may start immediately.

Assume now that process 1 ends. Process 1 informs the data set manager that it no longer needs the data sets A, B, and D. The data set manager tracks the request and the usage of all the data sets. The data set manager determines that data sets A and B are still in use, and thus does not release them. However, since no other process is using the data set D, the data set manager releases the data set D from use.

Assume that process 2 ends its use of the data sets it as requested. Process 2 informs the data set manager of this situation, and the data set manager checks whether it is proper to release the data sets previously in use by process 2. Upon checking, the data set manager determines that the data set A may be released, but data sets B and C are still in use by process 3.

In this manner, the network solution determines which particular data sets are no longer needed and can be freed. This allows for conservation of resources in the determination of network solutions using edges and nodes across predetermined data sets.

The implementation of these and other constructs may be achieved in many forms and across many computing platforms. Such point-to-point computational constructs can be implemented in such languages as C++.

As such, a massive point to point route calculations system is described. In view of the above detailed description of the present invention and associated drawings, other modifications and variations will now become apparent to those skilled in the art. It should also be apparent that such other modifications and variations may be effected without departing from the spirit and scope of the present invention as set forth in the claims which follow.

We claim:

1. A method for dynamically generating transport parameter values from an arbitrarily selected origin point to all possible destination points in a spatially-oriented array of points, the method being executed using at least one processor and comprising the steps of:
   dynamically generating, using at least one processor, a minimal area spatially-oriented array comprising a set of desired points for which overall transport parameter values are desired, the minimal area spatially-oriented array positioned relative to the arbitrarily selected points;
   generating, using the at least one processor, at a prior time a plurality of pre-processed data sets comprising precalculated transport parameter values for points within each of the plurality of pre-processed data sets, the pre-processed data sets comprising at least the set of desired points;
   dynamically associating selected ones of the pre-processed data sets so that each of the associated pre-processed data sets intersects the minimal area spatially-oriented array; and
   dynamically generating, using the at least one processor, transport parameter values from the arbitrarily selected origin point to all possible destination points within the set of desired points by relating to the origin point the precalculated transport parameter values, in which the dynamically generated transport parameter values are constant over time.

2. The method of claim 1 wherein the transport parameter values are travel times on a road.

3. The method of claim 1 wherein the transport parameter values are travel parameters associated with a computer network.

4. The method of claim 1 further comprising:
   dynamically making available the selected ones of the pre-processed data sets on an as needed basis.

5. A method for dynamically generating transport parameter values from an arbitrarily selected origin point to all possible destination points in a spatially-oriented array of points, comprising the steps of:
   dynamically generating, using at least one processor, a minimal area spatially-oriented array comprising a set of desired points for which overall transport parameter values are desired, the minimal area spatially-oriented array positioned relative to the arbitrarily selected points;
   generating, using the at least one processor, at a prior time a plurality of pre-processed data sets comprising precalculated transport parameter values for points within each of the plurality of pre-processed data sets, the pre-processed data sets comprising at least the set of desired points;
   dynamically associating selected ones of the pre-processed data sets so that each of the associated pre-processed data sets intersects the minimal area spatially-oriented array; and
   dynamically generating, using the at least one processor, transport parameter values from the arbitrarily selected origin point to all possible destination points within the set of desired points by relating to the origin point the precalculated transport parameter values, in which the dynamically generated transport parameter values vary over time.

6. The method of claim 5 wherein the transport parameter values are travel times on a road.

7. The method of claim 5 wherein the transport parameter values are travel parameters associated with a computer network.

8. The method of claim 5 further comprising:
   dynamically making available the selected ones of the pre-processed data sets on an as needed basis.

\* \* \* \* \*